US009420464B2

(12) United States Patent
Allyn

(10) Patent No.: US 9,420,464 B2
(45) Date of Patent: Aug. 16, 2016

(54) TECHNOLOGIES FOR CONTROLLING NETWORK ACCESS BASED ON ELECTRONIC DEVICE COMMUNICATION FINGERPRINTS

(71) Applicant: Intel Corporation, Santa Clara, CA (US)

(72) Inventor: Mark A. Allyn, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/570,575

(22) Filed: Dec. 15, 2014

(65) Prior Publication Data

US 2016/0174072 A1    Jun. 16, 2016

(51) Int. Cl.
| | |
|---|---|
| *H04M 1/66* | (2006.01) |
| *H04W 12/06* | (2009.01) |
| *H04W 4/02* | (2009.01) |
| *H04L 29/06* | (2006.01) |
| *H04L 12/58* | (2006.01) |

(52) U.S. Cl.
CPC ............... *H04W 12/06* (2013.01); *H04L 51/38* (2013.01); *H04L 63/0876* (2013.01); *H04W 4/025* (2013.01)

(58) Field of Classification Search
CPC .................... G06Q 20/3674; G06Q 20/40145; H04M 1/66; H04W 12/08
USPC ........ 455/410, 434, 411, 560; 640/5.82, 5.52; 705/7.29, 3, 7.19; 726/5, 19; 713/168; 340/5.53, 5.6
See application file for complete search history.

(56) References Cited

U.S. PATENT DOCUMENTS

| | | | | |
|---|---|---|---|---|
| 9,002,373 B2 * | 4/2015 | Marti | ..................... | G01S 5/0242 370/328 |
| 2013/0167207 A1 * | 6/2013 | Davis | ..................... | G06F 21/316 726/5 |

OTHER PUBLICATIONS

Luther, "Resistance 101: Why You Should Consider Ham Radio for Communications," Article, Feb. 21, 2014, 13 pages.

* cited by examiner

*Primary Examiner* — Kiet Doan
(74) *Attorney, Agent, or Firm* — Barnes & Thornburg LLP

(57) ABSTRACT

Technologies for monitoring network access and/or usage include mobile computing devices in communication with network devices to facilitate access to a network. Communication signals are transmitted from one of the mobile computing devices and received by a remote computing device (e.g., a network device). Transients of characteristics of the communication signals received during a power-on sequence of the mobile computing device are analyzed to generate a communication fingerprint corresponding to the communication signal. The network device then compares the communication fingerprint to authorized communication fingerprints to determine whether to grant network access to the mobile computing device corresponding to the communication fingerprint. Additionally, granted network access may be monitored to determine whether any unauthorized use is being performed by the mobile computing device. Further, network access may then be restricted if unauthorized use is detected.

25 Claims, 7 Drawing Sheets

TECHNOLOGIES FOR CONTROLLING NETWORK ACCESS BASED ON ELECTRONIC DEVICE COMMUNICATION FINGERPRINTS

BACKGROUND

Modern computing devices have become ubiquitous tools for personal, business, and social uses. As such, many modern computing devices are mobile and capable of connecting to various data networks, including the Internet and corporate intranets, to retrieve and transmit/receive data communications over such networks. Oftentimes, a user of a computing device may have network access restrictions based on their login credentials (i.e., username and password). Additionally, the user may have physical access restrictions based on a level of access granted to them via an access control system.

In a workplace environment, as an example, users in an employee capacity may have physical access restrictions at their place of employment (e.g., building, floor, etc.), which may be based on a variety of factors such as their employment position (i.e., job description). For example, in a research and development laboratory that includes Lab A and Lab B, where Employee A is assigned to Lab A and Employee B is assigned to Lab B, each of Employee A and Employee B may have access cards to scan upon entering their respective labs, which grants them access to their assigned labs and restrict access to labs which they are not assigned. In such a scenario, were Employee B able to acquire Employee A's access card, Employee B could have unfettered access to Lab A. In a similar example, where Employee A is further assigned Mobile Computing Device A and Employee B is further assigned Mobile Computing Device B, were Employee B able to acquire Employee A's login credentials, Employee B could use Employee A's login credentials on Mobile Computing Device B to access confidential files, making it appear as though Employee A was the one who accessed the confidential files. Masking one mobile computing device (e.g., ghosting a network interface card (NIC), machine access control (MAC) address, internet protocol (IP) address, etc.) to appear as another mobile computing device in software is a fairly simple process, which makes it difficult to identify a user by the MAC or IP address associated with a mobile computing device used for malicious purposes.

Further, the mobility afforded users of mobile computing devices with access to a public or private wireless network may allow the users to access the wireless network without needing physical access to a particular location (e.g., a restricted location), which could otherwise be readily identifiable and locatable. Additionally, a user with malicious intent (e.g., a "paid-off" employee, a disgruntled former employee, a "black hat" hacker, a cracker, or the like) having access to the wireless network may use their own mobile computing device on the wireless network for malicious behavior (e.g., port-sniffing, obtaining otherwise protected documents, etc.) without needing to access an easily locatable wired workstation. As such, pre-emptively detecting a user's attempt to access the network with an unauthorized mobile computing device or restricting the access of an authorized user on an authorized mobile computing device upon detection of malicious behavior is difficult using software defined characteristics of the mobile computing device.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
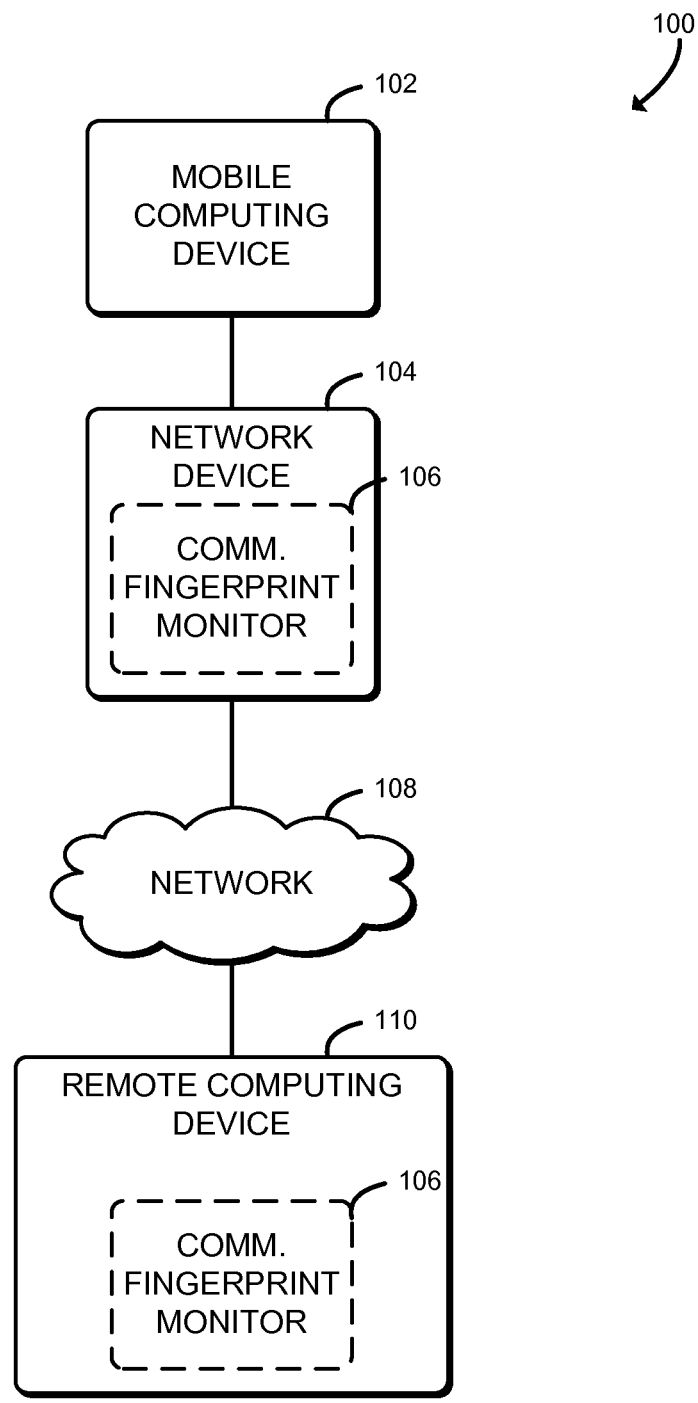
FIG. 1 is a simplified block diagram of at least one embodiment of a system for monitoring communication fingerprints to control network access of mobile computing devices on a network.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for controlling network access includes one or more mobile computing devices 102 and one or more remote computing devices 110, which communicate with each other over a network 108 via a network device 104. In the illustrative embodiment shown in FIG. 1, the network device 104 and/or the remote computing device 110 may include a communication fingerprint monitor 106. In use, as will be described in further detail below, the communication fingerprint monitor 106 receives communication signals from the mobile computing device 102. The communication fingerprint monitor 106 is configured to analyze the communication signals to generate a communication fingerprint corresponding to the communication signals transmitted by the mobile computing device 102.

It should be appreciated that communication signals from different computing devices may have unique qualities or characteristics, which may be used to identify the different computing devices. For example, every communication-capable electronic device has a unique transient signature or "communication fingerprint" during the initial stages of a transmission. The unique transient signature is due to minute variations in the electrical and physical characteristics of the electronic device, especially those components of the electronic device's communication circuitry. For example, the frequency and signal strength (i.e., amplitude) transients of the communication signals received from the mobile computing device 102 may be different from those of another computing device even when the other computing device is transmitting the same data (e.g., the same password or passcode). As such, in the illustrative embodiment, the communication fingerprint monitor 106 is configured to analyze the frequency and signal strength transients of the communication signals received from the mobile computing device 102, as the wireless network communication circuitry of the mobile computing device 102 is powered up to full power steady state. For example, in some embodiments, the communication fingerprint monitor 106 may be configured to generate the communication fingerprint based on the frequency and signal strength transients of the communication signals received during the amount of time the wireless network communication circuitry of the mobile computing device 102 takes to reach full power. The communication fingerprint monitor 106 may then compare the obtained communication fingerprint to a set of authorized communication fingerprints corresponding to one or more mobile computing devices 102 that have been previously authorized to access the network. The communication fingerprint monitor 106 may provide an indication to the network device 104 and/or the remote computing device 110, whichever is housing the communication fingerprint monitor 106, indicating whether to grant or restrict access to the network 108. The indication may be based on whether the communication fingerprint received by the communication fingerprint monitor 106 corresponds to one of the authorized mobile computing devices.

Additionally, in some embodiments, the communication fingerprint monitor 106 may monitor the access of an authorized mobile computing device to detect whether any unapproved behavior (i.e., inappropriate website browsing using a work issued mobile computing device, malicious port sniffing, etc.) is being perpetrated by a user of the authorized mobile computing device. Under such conditions in which the communication fingerprint monitor 106 detects unauthorized behavior perpetrated by the authorized mobile computing device, the communication fingerprint monitor 106 may provide an indication to the network device 104 and/or the remote computing device 110, whichever is housing the communication fingerprint monitor 106, indicating to restrict the authorized mobile computing device's access to the network 108. It should be appreciated that the system 100 may include any number of network devices 104, and any number of mobile computing devices 102 may be authorized to access the network 108 and/or the remote computing device 110.

In embodiments in which the communication fingerprint monitor 106 has indicated that access to the network 108 for either an authorized mobile computing device or an unauthorized mobile computing device should be restricted, the communication fingerprint monitor 106 may additionally determine a location of the mobile computing device 102 with the restricted access. In such embodiments, the communication fingerprint monitor 106 may additionally or alternatively provide an indication to the network device 104 and/or the remote computing device 110, whichever is housing the communication fingerprint monitor 106, indicating the location of the mobile computing device 102 with restricted access. In some embodiments, upon receiving the indication, the network device 104 and/or the remote computing device 110 may then communicate an alert to an access control system (not shown), which may then perform some security function such as, for example, repositioning a field of view of one or more cameras of the access control system based on the location of the mobile computing device 102 with restricted access. In some embodiments, despite restricting access to the network 108, the communication fingerprint monitor 106 may continue to monitor the location of the mobile computing device 102 with restricted access and provide the indication to the network device 104 and/or the remote computing device 110 indicating the location of the mobile computing device 102 with restricted access.

As noted previously, the communication fingerprint monitor 106 may be located in the network device 104 and/or the remote computing device 110. In some embodiments, such as when the network device 104 allows access to a public network (i.e., an open network), any mobile computing device 102 in range of the network device 104 and capable of connecting wirelessly to the public network (e.g., network 108) may be considered an authorized mobile computing device. In such embodiments, access to the public network may be unrestricted; however, monitoring may be needed prior to any network traffic from the mobile computing device 102 reaching the network 108 and/or the remote computing device 110. As such, the communication fingerprint monitor 106 is likely to reside in the network device 104 to restrict network 108 access prior to the mobile computing device 102 accessing the remote computing device 110.

In some embodiments, sensitive data may reside at the remote computing device 110. The sensitive data may include files or other data structures with confidential information, such as, employee identification information, medical information, trade secrets, etc. In such embodiments, an administrator of the remote computing device 110 is likely to prefer that a potentially malicious user of the mobile computing device 102 be detected upstream of the remote computing device 110 and the sensitive data that may be residing therein. As such, the administrator may place the communication fingerprint monitor 106 in the network device 104, as opposed to (or in addition to) the remote computing device 110. In some embodiments, the administrator may be a network administrator, an owner of the area in which the mobile computing device 102 is being used, etc.

In some embodiments, a subset of mobile computing devices 102 that are authorized may only be authorized for a designated area. The designated area may be embodied as any definable area such as an area of a building (e.g., a laboratory, a conference room, a floor of a building, a section of cubicles, etc.) In such embodiments, the network device 104 may be configured to only authorize access to the network 108 for the subset of mobile computing devices 102 that are authorized for that particular network device 104 servicing the designated area. As such, the communication fingerprint monitor 106 is likely to reside in the network device 104. It should be appreciated that, in some embodiments, the system 100 may include more than one network device 104. In such embodiments, an instance of the communication fingerprint monitor 106 may be included in any or all of the network devices 104. It should be further appreciated that, in such embodiments, management of the access to the remote computing device 110 may be delegated from the network devices 104 to the remote computing device 110, in which case the remote computing device 110 would include the communication fingerprint monitor 106, as opposed to the network devices 104. Of course, in some embodiments, the communication fingerprint monitor 106 may be included in both the network device 104 and the remote computing device 110.

Figure 2:
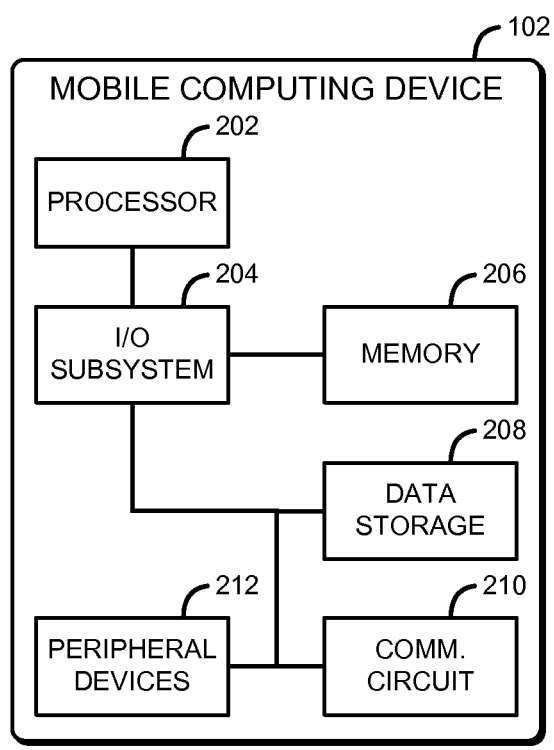
FIG. 2 is a simplified block diagram of at least one embodiment of a mobile computing device of the system of FIG. 1.

Referring now to FIG. 2, the mobile computing device 102 may be embodied as any type of computing device capable of accessing a wireless network and performing the functions described herein. For example, the mobile computing device 102 may be embodied as, without limitation, a laptop computer, a notebook computer, a tablet computer, a smartphone, a wearable computing device, a computer, a multiprocessor system, a consumer electronic device, a smart appliance, and/or any other computing device capable of wirelessly accessing the network 108. In the illustrative embodiment of FIG. 2, the mobile computing device 102 includes a processor 202, an input/output (I/O) subsystem 204, a memory 206, a data storage 208, a communication circuit 210, and one or more peripheral devices 212. Of course, the mobile computing device 102 may include other or additional components, such as those commonly found in a smartphone (e.g., various input/output devices), in other embodiments. Additionally, in some embodiments, one or more of the illustrative components may be incorporated in, or otherwise form a portion of, another component. For example, the memory 206, or portions thereof, may be incorporated in the processor 202 in some embodiments The processor 202 may be embodied as any type of processor capable of performing the functions described herein. For example, the processor 202 may be embodied as a single or multi-core processor(s), digital signal processor, microcontroller, or other processor or processing/controlling circuit. The memory 206 may be embodied as any type of volatile or non-volatile memory or data storage capable of performing the functions described herein. In operation, the memory 206 may store various data and software used during operation of the mobile computing device 102. The memory 206 is communicatively coupled to the processor 202 via the I/O subsystem 204, which may be embodied as circuitry and/or components to facilitate input/output operations with the processor 202, the memory 206, and other components of the mobile computing device 102. For example, the I/O subsystem 204 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 204 may form a portion of a system-on-a-chip (SoC) and be incorporated, along with the processor 202, the memory 206, and other components of the mobile computing device 102, on a single integrated circuit chip. The data storage 208 may be embodied as any type of device or devices configured for short-term or long-term storage of data, such as, memory devices and circuits, memory cards, hard disk drives, solid-state drives, or other data storage devices, for example.

The communication circuit 210 may be embodied as any communication circuit, device, or collection thereof, capable of enabling communications between the mobile computing device 102 and the network device 104. The communication circuit is configured to receive the communication signals from the mobile computing devices 102. The communication circuit 210 may be configured to use any communication technologies (e.g., wireless or wired communications) and associated protocols (e.g., Ethernet, Bluetooth®, Wi-Fi®, WiMAX, 3G, 4G LTE, etc.) to effect such communication. In some embodiments, the communication circuit 210 additionally or alternatively includes cellular communication circuitry and/or other long-ranged wireless communication circuitry.

The one or more peripheral devices 212 may include any type of peripheral device commonly found in a computing device, and particularly in a mobile computing device, such as a hardware keyboard, input/output devices, peripheral communication devices, and/or the like, for example. Additionally or alternatively, the peripheral devices 212 may include one or more ports for connecting external peripheral devices to the mobile computing device 102, such as USB, for example.

Figure 3:
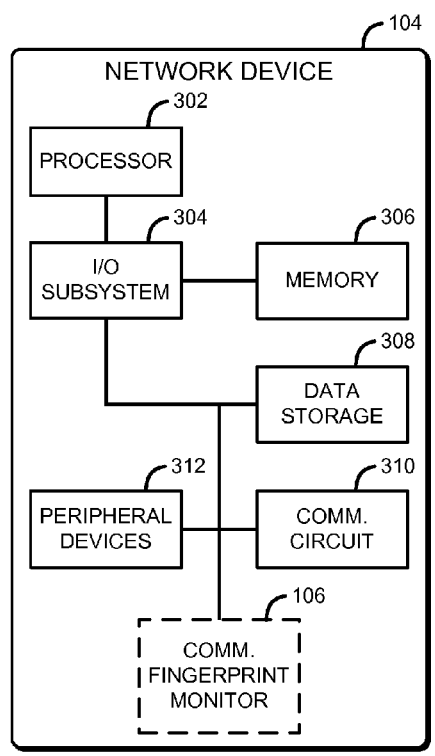
FIG. 3 is a simplified block diagram of at least one embodiment of a network device including a communication fingerprint monitor to monitor communication fingerprints of the mobile computing devices of FIG. 1.

Referring now to FIG. 3, the network device 104 may be embodied as any type of computing device capable of facilitating wireless network communications between the network 108 and the one or more mobile computing device 102, and performing the functions described herein. For example, the network device 104 may be embodied as, without limitation, an access point, a router, a server, a network hub, etc. Similar to the mobile computing device 102 illustrated in FIG. 2, the illustrative network device 104 includes a processor 302, an input/output (I/O) subsystem 304, a memory 306, a data storage 308, a communication circuit 310, and one or more peripheral devices 312. As such, further descriptions of the like components are not repeated herein for clarity of the description with the understanding that the description of the corresponding components provided above in regard to the mobile computing device 102 of FIG. 2 applies equally to the corresponding components of the network device 104 of FIG.

3. Additionally, as discussed previously, a communication fingerprint monitor 106 may be included in the network device 104 in some embodiments as shown in FIG. 3 and described in further detail below. As discussed in more detail below in regard to FIG. 5, the communication fingerprint monitor 106 may be embodied as hardware, firmware, software, or a combination thereof to perform the functions described herein.

Figure 4:
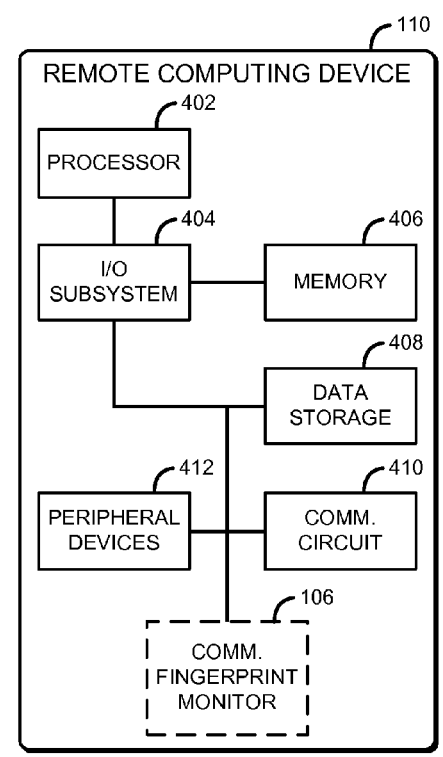
FIG. 4 is a simplified block diagram of at least one embodiment of a remote computing device including a communication fingerprint monitor to monitor communication fingerprints of the mobile computing devices of FIG. 1.

Referring now to FIG. 4, the remote computing device 110 may be embodied as any type of compute and/or store device or computing device capable of performing the functions described herein, including, without limitation, a computer, a smartphone, a tablet computer, a laptop computer, a notebook computer, a mobile computing device, a wearable computing device, a multiprocessor system, a server (e.g., stand-alone, rack-mounted, blade, etc.), a network appliance, a web appliance, a distributed computing system, a processor-based system, and/or a consumer electronic device. Again, similar to the mobile computing device 102 illustrated in FIG. 2, the illustrative remote computing device 10 includes a processor 402, an input/output (I/O) subsystem 404, a memory 406, a data storage 408, a communication circuit 410, and one or more peripheral devices 412. As such, further descriptions of the like components are not repeated herein for clarity of the description with the understanding that the description of the corresponding components provided above in regard to the mobile computing device 102 of FIG. 2 applies equally to the corresponding components of the remote computing device 110 of FIG. 4. Additionally, as discussed previously, a communication fingerprint monitor 106 may be included in the remote computing device 110 in some embodiments as shown in FIG. 4 and described in further detail below.

In some embodiments, the network device 104 and/or the remote computing device 110, whichever is housing the communication fingerprint monitor 106, may store a table, database, or other data structure (e.g., in the data storage 308, 408) of communication fingerprints corresponding to authorized mobile computing devices. The table may additionally include information specific to each authorized mobile computing devices, such as electronic component attributes, vendor, and/or model of each authorized mobile computing device, for example. In some embodiments, the table may additionally include login credentials corresponding to authorized users of the authorized mobile computing devices. In some embodiments, particular authorized users may be assigned to particular authorized mobile computing devices.

Figure 5:
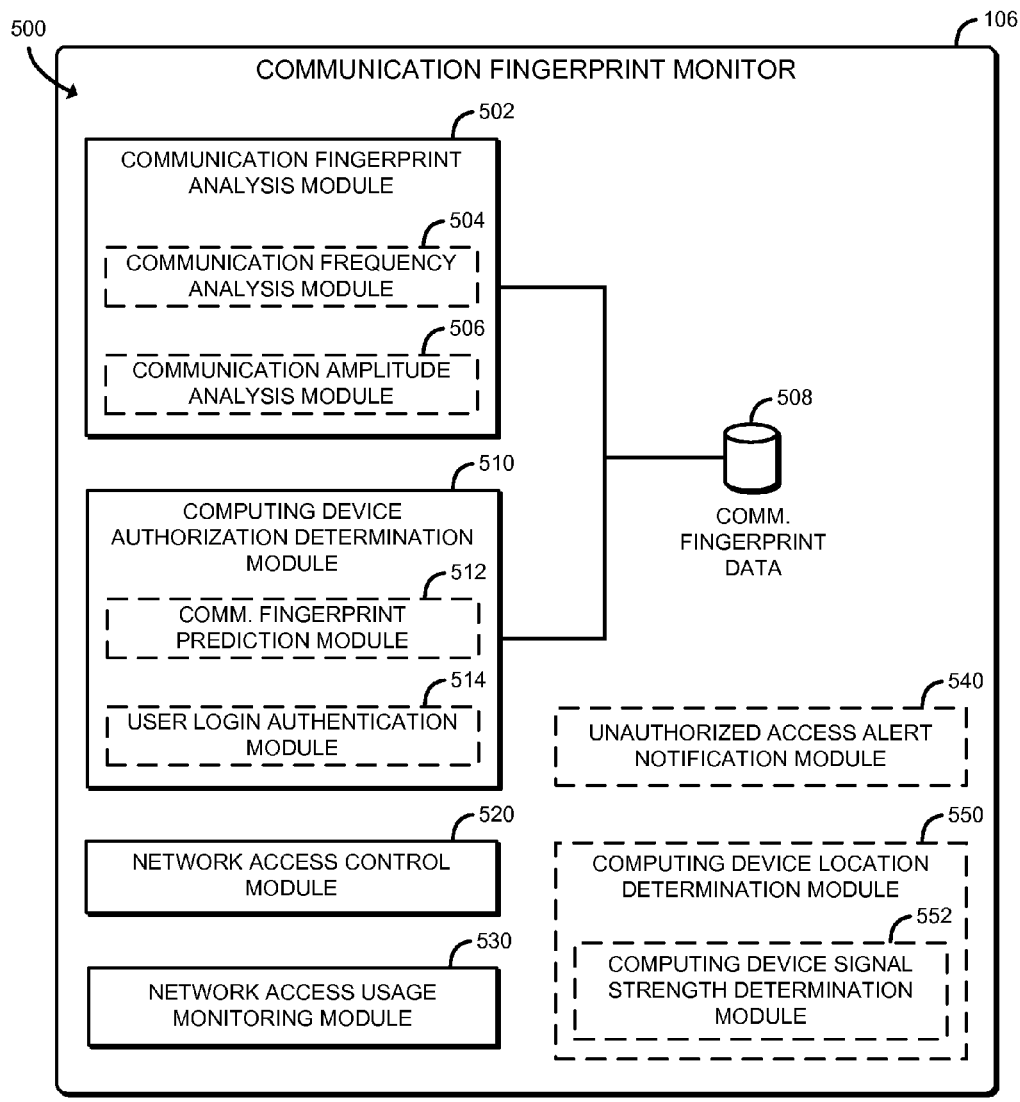
FIG. 5 is a simplified block diagram of at least one embodiment of the communication fingerprint monitor of the devices of FIGS. 3 and 4.

Referring now to FIG. 5, each communication fingerprint monitor 106 of the system 100 may be embodied as hardware, firmware, software, or a combination thereof. For example, in some embodiments, the communication fingerprint monitor 106 may be embodied as a special purpose circuit for performing the functions described herein. In such embodiments, the communication fingerprint monitor circuit may be included in the communication circuit(s) 310, 410 for the network device 104 and/or remote computing device 110. Additionally or alternatively, the communication fingerprint monitor 106 may be implemented by the processor 302, 402 of the network device 104 and/or remote computing device 110.

In use, the communication fingerprint monitor 106 establishes an environment 500 during operation. The illustrative environment 500 includes a communication fingerprint analysis module 502, a computing device authorization determination module 510, and a network access control module 520. The environment 500 additionally includes communication fingerprint data 508 that may include communication fingerprint data corresponding to one or more mobile computing devices 102. For example, each time the mobile computing device 102 attempts to authenticate via the communication fingerprint monitor 106, the corresponding communication fingerprint may be stored in the communication fingerprint data 508. In some embodiments, the communication fingerprint data 508 may additionally include mobile computing device 102 information, such as hardware component attributes, vendor, and/or model of the authorized mobile computing devices. In the illustrative environment 500, each of the communication fingerprint analysis module 502 and the computing device authorization determination module 510 have access to the communication fingerprint data 508.

The various modules of the environment 500 may be embodied as hardware, firmware, software, or a combination thereof. For example the various modules, logic, and other components of the environment 500 may form a portion of, or otherwise be established by, the processor 302, 402 or other hardware components of the network device 104 or the remote computing device 110. As such, in some embodiments, one or more of the modules of the environment 500 may be embodied as a circuit or collection of electrical devices (e.g., an communication fingerprint analysis circuit, a computing device authorization determination circuit, a network access control circuit, etc.).

The communication fingerprint analysis module 502 analyzes the communication signals received at the communication fingerprint monitor 106 to generate a communication fingerprint. As discussed above, the communication fingerprint is based on characteristics of the communication signals received from the mobile computing device 102 during an initialization period of at least a portion of the communication circuit 210. To do so, the communication fingerprint analysis module 502 may be configured to analyze the received communication signals to determine transient characteristics of the received communication signals. Again, as discussed above, each mobile computing device 102 typically has a unique transient communication fingerprint, or communication signature, when starting a transmission. The communication fingerprint is attributable to minute variations in the electrical and physical characteristics of the electronic (i.e., hardware) components of the mobile computing device 102. Since the communication fingerprint is based on hardware components, the communication fingerprint cannot be easily altered to mask an unauthorized device as an authorized mobile computing device. In some embodiments, the communication fingerprint analysis module 502 may include a communication frequency analysis module 504 to analyze the frequency transients of the received communication signals. Additionally, in some embodiments, the communication fingerprint analysis module 502 may include a communication amplitude analysis module 506 to analyze the amplitude (i.e., signal strength) transients of the received communication signals.

In use, as will be described in further detail below, the computing device authorization determination module 510 is configured to determine whether the mobile computing device 102 is an authorized mobile computing device. The computing device authorization determination module 510 may compare the generated communication fingerprint with a last known communication fingerprint to determine whether the received communication fingerprint matches an authorized mobile computing device. In some embodiments, the computing device authorization determination module 510 may retrieve the last known communication fingerprint from the communication fingerprint data 508.

In some embodiments, the computing device authorization determination module 510 may include a communication fingerprint prediction module 512 to predict changes in the communication fingerprint of a mobile computing device 102 over time. In addition to the present communication fingerprint data corresponding to an authorized mobile computing device being stored in the communication fingerprint data 508, one or more previous authorized communication fingerprints may be stored in the communication fingerprint data 508, as well. In some embodiments, the one or more previous authorized communication fingerprints may be used to account for component degradation by predicting an acceptable deviation from the last known communication fingerprint stored in the communication fingerprint data 508. As electrical components age, the characteristics of the electrical components change, which over time affects the communication signals, and, consequently, the communication fingerprints. Storing the previous authenticated communication fingerprints allows for an amount of hysteresis to be added to the last known authenticated communication fingerprint, for example, to predict the acceptable deviation used to authenticate the presently received communication fingerprint.

In addition to the communication fingerprint data corresponding to an authorized mobile computing device, the communication fingerprint data 508 may additionally include login credentials corresponding to a user assigned to the mobile computing device 102. In such embodiments, the computing device authorization determination module 510 may include a user login authentication module 514 to verify the user corresponds to the mobile computing device 102 being authorized. For example, when the mobile computing device 102 is started up, or when network login is requested, the mobile computing device 102 may prompt the user for login credentials (e.g., username and password). The login credentials may be sent (i.e., transmitted) to the communication fingerprint monitor 106. Subsequent to determining that the communication fingerprint received from the mobile computing device 102 matches an authorized communication fingerprint (authenticating the mobile computing device 102), the user login authentication module 514 may compare the received login credentials to the login credentials corresponding to the assigned user of the mobile computing device 102.

The network access control module 520 is configured to provide an indication to the network device 104 and/or the remote computing device 110 indicating whether to grant or restrict access to the network 108. The indication may be based on whether the computing device authorization determination module 510 has authenticated the received communication fingerprint, or not. In some embodiments, the indication may be further based on whether the computing device authorization determination module 510 has authenticated the login credentials, or not.

The network access usage monitoring module 530 is configured to monitor the network access (i.e., network usage) of the mobile computing device 102 for unapproved usage. The network access usage monitoring module 530 may monitor for potentially malicious activity, such as port scanning, denial-of-service (DoS) attacks, repeated attempts to login to a remote computing device, communicating with known botnet control stations, downloading suspicious or restricted files, etc.

In some embodiments, the communication fingerprint monitor 106 may additionally include an unauthorized access alert notification module 540. The unauthorized access alert notification module 540 is configured to provide an indication to the network device 104 and/or the remote computing device 110 indicating that an unauthorized mobile computing device attempted to access the network 108. The unauthorized access alert notification module 540 is further configured to provide an indication to the network device 104 and/or the remote computing device 110 indicating that an authorized mobile computing device engaged in unapproved usage of the network 108. In some embodiments, the indication may prompt the network device 104 and/or the remote computing device 110 to communicate an alert (e.g., an email) indicating that an unauthorized mobile computing device attempted to access the network 108. For example, in certain embodiments, the alert may be sent to a network administrator, an owner of the area in which the unauthorized mobile computing device is being used, law enforcement officials, etc. The alert may include identifiers corresponding to the unauthorized mobile computing device, such as the location of the unauthorized mobile computing device, the type of the unauthorized mobile computing device, etc. In some embodiments, the indication may prompt the network device 104 and/or the remote computing device 110 to communicate an event corresponding to the alert to an access control system to trigger one or more access control system cameras to reposition (i.e., pan, tilt, zoom, etc.) the field of view of the one or more access control system cameras to focus on the location of the unauthorized mobile computing device.

In some embodiments, the communication fingerprint monitor 106 may additionally include a computing device location determination module 550. The computing device location determination module 550 is configured to determine a location of the mobile computing device 102. The location of the mobile computing device 102 may be a general location or a specific location. In embodiments where the communication fingerprint monitor 106 is included in the network device 104, for example, the location may correspond to a general location of the network device 104, such as, a particular floor of a building. In some embodiments, the computing device location determination module 550 may include a computing device signal strength determination module 552 configured to determine a more specific location of the mobile computing device 102, such as by using received signal strength indication (RSSI) measurement techniques. In some embodiments, such as where the communication fingerprint monitor 106 is included in the remote computing device 110, the computing device signal strength determination module 552 may coordinate with any network devices 104 in a general vicinity of the network device 104 that the mobile computing device 102 is presently connected to, in order to triangulate a more specific location of the mobile computing device 102. In some embodiments, an application running on the mobile computing device 102 may provide global positioning system (GPS) coordinates to the communication fingerprint monitor 106 to identify the present location of the mobile computing device 102.

Figure 6:
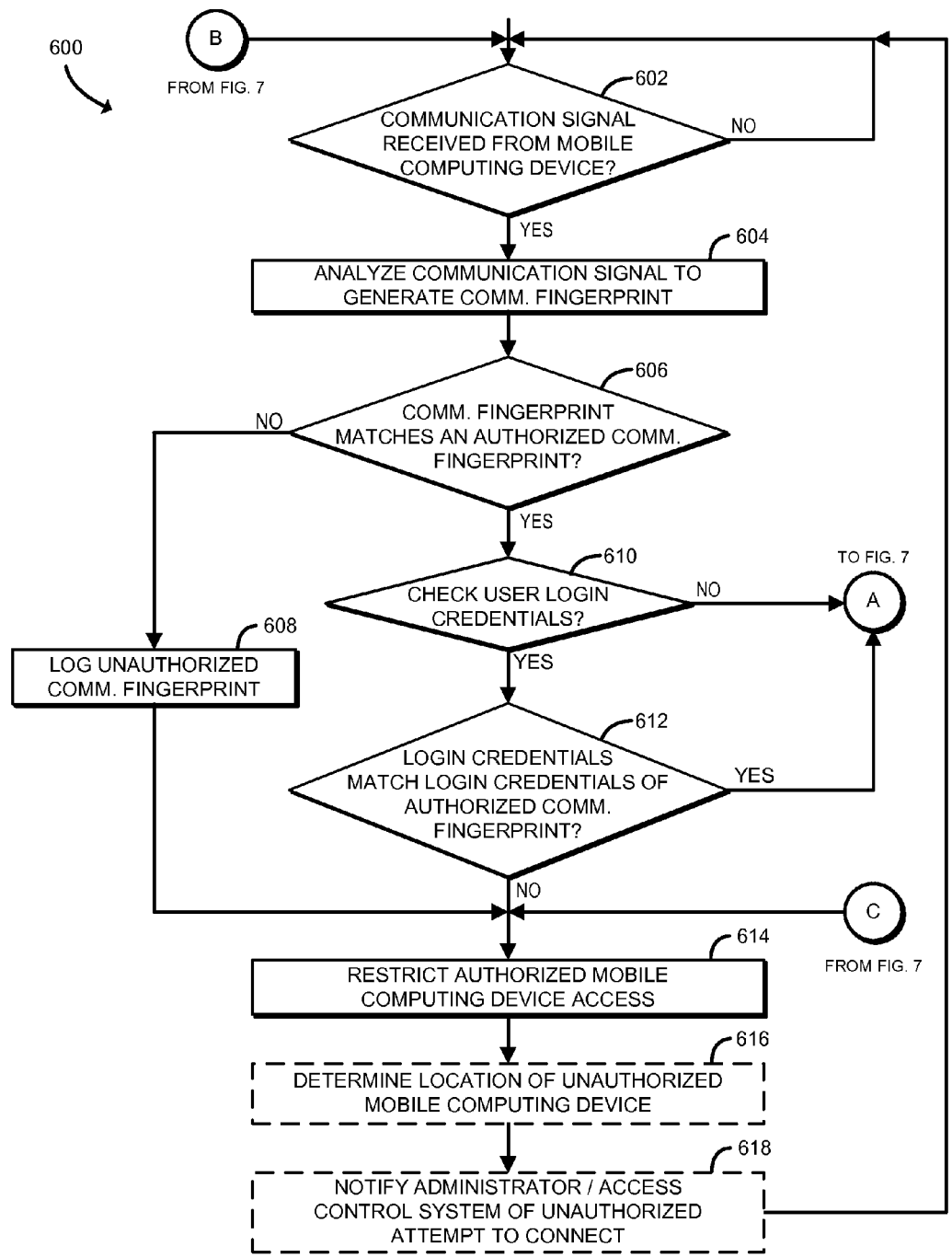
FIGS. 6 and 7 are a simplified flow diagram of at least one embodiment of a method for authenticating and monitoring communication fingerprints of the computing devices of the system of FIG. 1 that may be executed by the communication fingerprint monitor of FIGS. 3 and 4.
Figure 7:
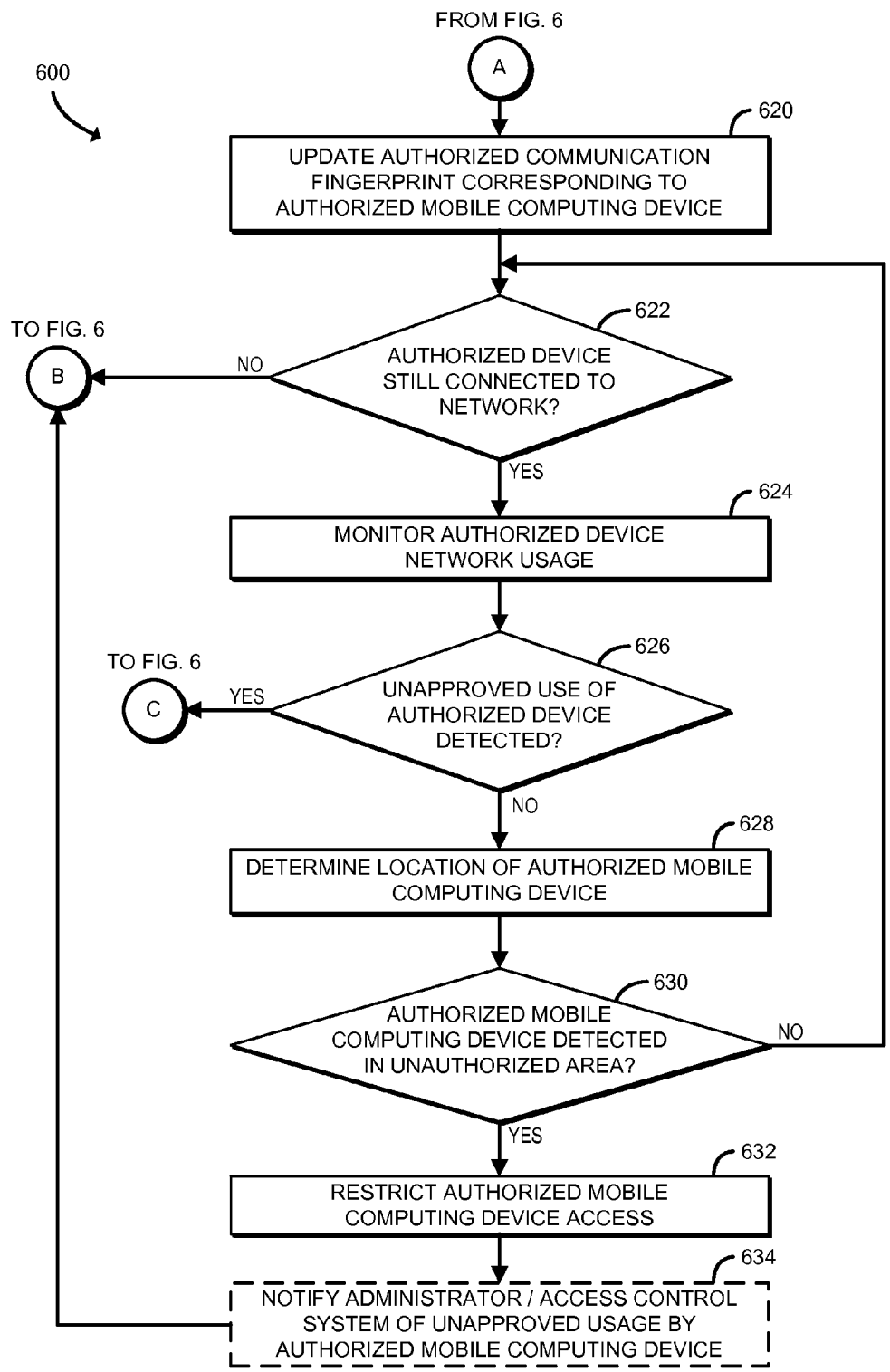

Referring now to FIGS. 6 and 7, in use, the communication fingerprint monitor 106 may execute a method 600 for authorizing and/or monitoring communication fingerprints from a mobile computing device 102. The method 600 begins with block 602, in which the communication fingerprint monitor 106 determines whether a communication signal is received from the mobile computing device 102. If not, the method 600 loops back to block 602 to continue monitoring for communication signals. In some embodiments, the method 600 does not function as a polling method (i.e., sampling at predetermined time intervals), and the method 600 may be initialized (i.e., started) upon receipt of the communication signal. If the communication signal has been received from the mobile computing device 102, the method advances to block 604.

In block 604, the communication fingerprint monitor 106 analyzes the communication signal received from the mobile computing device 102 to generate a communication fingerprint based on the received communication signal. To do so, as noted previously, the communication fingerprint monitor 106 may analyze properties of the communication signal, such as the frequency and signal strength transients received as the mobile computing device 102 is powered up to steady state, to generate the communication fingerprint. Data transmissions from the mobile computing device 102 does not typically begin until a finite amount of time after a transmission circuit of the mobile computing device 102 is energized. As will be described in further detail below, transients due to electrical characteristics of the transmission circuit associated with communication signals transmitted from the mobile computing device 102 are typically unique to each mobile computing device 102 and generally consistent over time. As such, a communication fingerprint based on the transients may be generated corresponding to the mobile computing device 102.

In block 606, the communication fingerprint monitor 106 determines whether the communication fingerprint matches an authorized communication fingerprint. In some embodiments, the communication fingerprint monitor 106 may include, or have access to, a table, database, or other data structure of authorized communication fingerprints corresponding to one or more predetermined authorized mobile computing devices. The predetermined authorized mobile computing devices may include single instances of authorized mobile computing devices (i.e., specific to each authorized mobile computing device), a group of authorized mobile computing devices having similar traits (e.g., specific to a model or batch of authorized mobile computing devices), and/or a subset of authorized mobile computing devices (e.g., only authorized mobile computing devices authorized for a particular area). In some embodiments, such as those in which the network device 104 allows communication via a publicly available Wi-Fi hot-spot, the communication fingerprint monitor 106 may allow any mobile computing device 102 capable of wirelessly connecting to the network device 104. In other words, any mobile computing device 102 capable of wirelessly connecting to the network device 104 may be considered to have an authorized communication fingerprint.

If the communication fingerprint does not match an authorized communication fingerprint, the method 600 advances to block 608, in which the unauthorized communication fingerprint is logged before the method advances to block 614. In some embodiments, logging the unauthorized communication fingerprint may include storing additional information, such as a timestamp corresponding to the time of the attempted connection, a media access control (MAC) address, and/or internet protocol (IP) address of the device mobile computing device 102, for example, which may be used to later identify the mobile computing device 102 and/or the user of the mobile computing device 102. If the communication fingerprint matches an authorized communication fingerprint, the method advances to block 610.

In block 610, the communication fingerprint monitor 106 determines whether to check the user login credentials (e.g., username, password, passphrase, biometric information, etc.). If not, the method 600 proceeds to block 620 of FIG. 7, which will be described in further detail below. If the user login credentials are to be checked, the method 600 advances to block 612. In block 612, the communication fingerprint monitor 106 determines whether the user login credentials received from the mobile computing device 102 match the user login credentials corresponding to the authorized communication fingerprint determined at block 606. If the user login credentials match, the method 600 proceeds to block 620 of FIG. 7. If the user login credentials do not match, the method 600 advances to block 614. It is contemplated that in some embodiments, a user of the mobile computing device 102 may be given a predetermined number of attempts to re-enter valid user login credentials before the method 600 advances to block 614. In some embodiments, the communication fingerprint monitor 106 may compare the received user login credentials to all stored user login credentials to determine whether an authorized user may be using another user's authorized mobile computing device. In such embodiments, the user may not be prompted to re-enter user login credentials and method 600 may instead advance directly to block 614.

In block 614, the communication fingerprint monitor 106 restricts the unauthorized mobile computing device access. In some embodiments, restricting access may include limiting all access to the network 108, limiting some access to the network 108, limiting all access to the remote computing device 110, and/or limiting some access to the remote computing device 110. For example, the communication fingerprint monitor 106 may only limit access to certain sensitive data on the remote computing device 110, leaving access to public documents and one or more "honeypots" to allow an administrator to monitor the behavior of the unauthorized user of the mobile computing device 102.

In some embodiments, in block 616, the communication fingerprint monitor 106 may determine a location of the unauthorized mobile computing device. As noted previously, any number of methods may be employed to determine the location of the unauthorized computing device, including, but not limited to, access point location identification, signal strength triangulation, radio direction finding, GPS coordinate tracking, etc. In some embodiments, in block 618, the communication fingerprint monitor 106 may provide an indication notifying an administrator and/or an access control system of the unauthorized mobile computing device having attempted to connect to the network 108, performed a potentially malicious attack, and/or attempted to connect to the remote computing device 110.

Referring now to FIG. 7, in block 620, the communication fingerprint monitor 106 updates the authorized communication fingerprint corresponding to an authorized mobile computing device, such as the mobile computing device 102 of FIG. 1. One or more authorized communication fingerprints corresponding to the authorized mobile computing device may be stored at a database that may be accessed by the communication fingerprint monitor 106. In some embodiments, such as an embodiment in which a single authorized communication fingerprint is stored, the previously stored fingerprint is discarded. In some embodiments, such as an embodiment in which more than one authorized communication fingerprint corresponding to the authorized mobile computing device is stored, the previously stored fingerprints may be used to determine an expected change in the authorized communication fingerprint corresponding to the authorized mobile computing device over time. As discussed above, the characteristics of electrical components changes as electrical components age. Taking an electrolytic capacitor, for example, as the electrolyte ages, the electrical resistance of the electrolytic capacitor changes. A power-on transient of an electrical device including the electrolytic capacitor may change over time as a result of the change in electrical resistance attributable to the increase in leakage current. As such, the historical changes of the authorized communication fingerprints can be tracked over time and future deviations predicted, and used to determine whether to authorize the mobile computing device 102.

In block 622, the communication fingerprint monitor 106 determines whether the authorized mobile computing device is still connected to the network. If not, the method 600 loops back to block 602. If the authorized mobile computing device is still connected to the network, the method 600 advances to block 624 to monitor the network usage of the authorized mobile computing device. In some embodiments, such as a public Wi-Fi network, the authorized mobile computing device may be granted unfettered access to visit any website or remote computing device of the user's choosing. In such embodiments, the communication fingerprint monitor 106 may monitor for malicious activity of the authorized mobile computing device, such as port scanning, denial-of-service (DoS) attacks, repeated attempts to login to a remote computing device, communicating with known botnet control stations, downloading suspicious or restricted files, etc.

In block 626, the communication fingerprint monitor 106 detects whether the authorized mobile computing device has been used in an unapproved manner. As noted previously, the unapproved usage may be malicious in nature. As such, if the communication fingerprint monitor 106 determines that an unapproved use of the authorized mobile computing device has been detected, the method advances to block 614, in which the authorized mobile computing device's access to the network 108 is restricted. However, in some embodiments, the authorized mobile computing device's access to the network 108 may not be immediately restricted in order to continue to further monitor the usage. In some embodiments, the unapproved use may be logged and stored for later retrieval. If the communication fingerprint monitor 106 does not detect any unapproved use by the authorized mobile computing device, the method 600 advances to block 628.

In block 628, the communication fingerprint monitor 106 determines the location of the authorized mobile computing device. In some embodiments, the location may correspond to a general vicinity, such as a floor of a building, a gate at an airport, a wing of a hospital, etc. In some embodiments, the communication fingerprint monitor 106 may determine the general vicinity based on which access point the authorized mobile computing device is presently connected to. In some embodiments, the location may be a more specific location. In some embodiments, the communication fingerprint monitor 106 may determine the more specific location based on a signal strength triangulation determined using multiple access points, GPS coordinates retrieved from the authorized mobile computing device, and/or any other known mobile computing device 102 finding means.

In block 630, the communication fingerprint monitor 106 determines whether the authorized mobile computing device is detected in an unauthorized area. If not, the method 600 loops back to block 622. If the authorized mobile computing device is detected in an unauthorized area, the method 600 advances to block 632 to restrict the authorized mobile computing device's access to the network 108 and/or the remote computing device 110. The previously described means of determining the present location of the authorized mobile computing device may be used to determine whether the authorized mobile computing device is detected in an unauthorized area. For example, the communication fingerprint monitor 106 may have access to a table, or virtual map, of authorized zones for each authorized mobile computing device that may be used to abstract the physical layout of a building. The communication fingerprint monitor 106 may compare the present location of the authorized mobile computing device against the table to determine whether the authorized mobile computing device is detected in an unauthorized area, or not.

In some embodiments, the authorized mobile computing device may need to be further monitored. In such embodiments, the communication fingerprint monitor 106 may not immediately restrict the authorized mobile computing device's access to the network 108 and/or the remote computing device 110 and/or may only restrict a portion of the authorized mobile computing device's access to the network 108 and/or the remote computing device 110 (i.e., restrict access to certain locations, files, etc.). As such, the communication fingerprint monitor 106 may continually monitor the network 108 usage and/or the remote computing device 110 accesses, and the location of the authorized mobile computing device. Additionally, In some embodiments, in block 634, similar to block 618, the communication fingerprint monitor 106 may provide an indication notifying an administrator and/or an access control system of unapproved usage of the network 108 and/or access to the remote computing device 110 by an authorized mobile computing device. For example, subsequent to the communication fingerprint monitor 106 determining the authorized mobile computing device is presently located in an area that the user of the authorized mobile computing device should not have physical access to, an alert may be generated. In some embodiments, the alert may be sent to an administrator and/or an access control system, such that the administrator and/or the access control system can take an action based thereon. In some embodiments, the alert may include information corresponding to the authorized mobile computing device, such as, if available, characteristics of the user (e.g., name, height, etc.), characteristics of the authorized mobile computing device (e.g., type, brand, size, etc.), and or the last known location of the authorized mobile computing device. In some embodiments, the action may be for an administrator to contact security. Additionally or alternatively, in some embodiments, the action may be for an access control system to adjust the field of view of one or more cameras in the area of the authorized mobile computing device to the location of the authorized mobile computing device.

Figure 8:
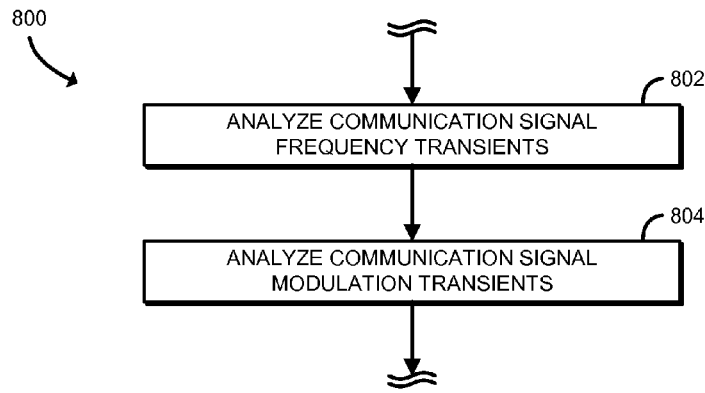
FIG. 8 is a simplified flow diagram of at least one embodiment of a method for analyzing the communication fingerprints of the computing devices of the system of FIG. 1 that may be executed by the communication fingerprint monitor of FIGS. 3 and 4.
Figure 9:
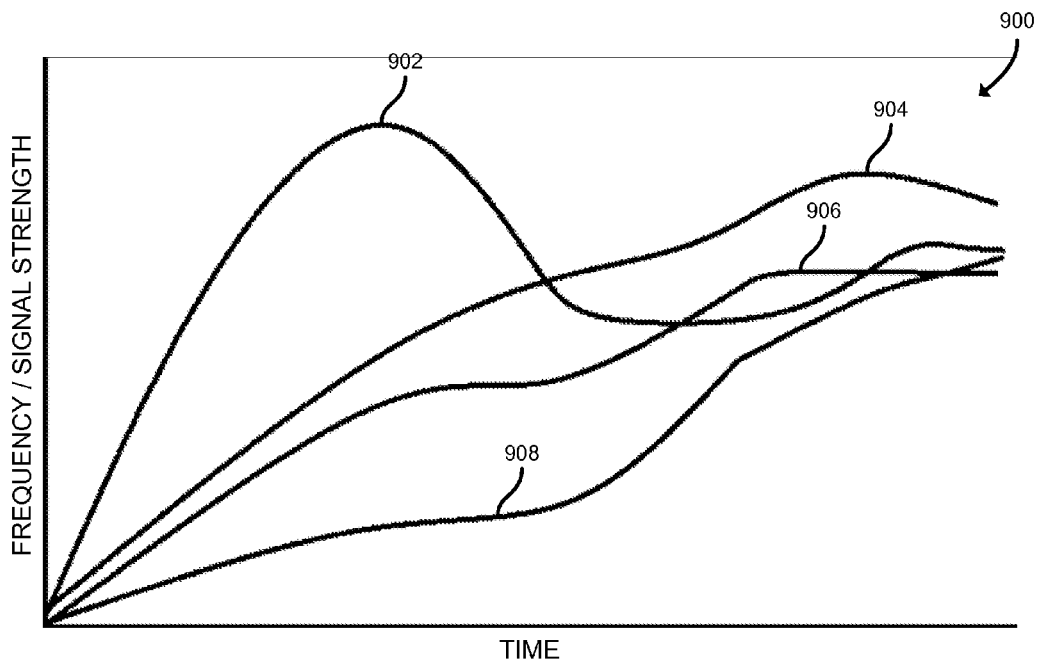
FIG. 9 is a graph illustrating an example of communication signal frequency and amplitude transients that are representative of two different communication fingerprints that may correspond to two different computing devices of FIG. 1.

Referring now to FIG. 8, in use, a communication fingerprint monitor 106 may execute a method 800 for analyzing the communication signal received from a mobile computing device 102 to generate a communication fingerprint based on a received communication signal (see, e.g., block 604 of method 600). The method 800 begins with block 802, in which frequency transients of the received communication signal are analyzed. The method 800 continues to block 804, in which amplitude transients of the received communication signal are analyzed. As noted previously, each mobile computing device 102 typically has a distinctive communication signal transient rise from zero power to full steady-state power. For example, FIG. 9 illustrates a graph 900 showing two example communication signals corresponding to two mobile computing devices 102. The first communication signal includes a first frequency 902 and a first amplitude 906. The second communication signal includes a second frequency 904 and a second amplitude 908. As illustrated in FIG. 9, the transient rise of each of the frequency and amplitude of the first and second communication signals from zero power to full steady-state power is distinct between the first and second communication signals. As such, two distinct communication fingerprints can be generated from the communication signals corresponding to each of the mobile computing devices 102.

Although each mobile computing device 102 has a distinctive communication signal transient rise from zero power to full steady-state power, a batch or a particular model of mobile computing devices 102 may transmit communication signals with sufficiently similar characteristics to identify the resulting communication fingerprint as corresponding to more than one authorized mobile computing device. As such, in some embodiments, a single communication fingerprint may be used to identify more than one authorized mobile computing device.

EXAMPLES

Illustrative examples of the technologies disclosed herein are provided below. An embodiment of the technologies may include any one or more, and any combination of, the examples described below.

Example 1 includes a computing device to monitor a communication signal received from a mobile computing device, the computing device comprising a processor to establish: a communication fingerprint analysis module to analyze the communication signal and generate a communication fingerprint based on the communication signal, wherein the communication fingerprint corresponds to a characteristics of the communication signal through a power-on sequence of a transmission circuit of the mobile computing device; a computing device authorization determination module to (i) compare the communication fingerprint to one or more authorized communication fingerprints that correspond to one or more mobile computing devices and (ii) determine whether the mobile computing device is authorized based on the comparison of the communication fingerprint and the one or more authorized communication fingerprints; and a network access control module to restrict access to a network by the mobile computing device in response to a determination that the mobile computing device is not authorized.

Example 2 includes the subject matter of Example 1, and wherein to generate the communication fingerprint based on the communication signal comprises to generate the communication fingerprint based on changes of a frequency of the communication signal through the power-on sequence.

Example 3 includes the subject matter of any of Examples 1 and 2, and wherein to generate the communication fingerprint based on the communication signal comprises to generate the communication fingerprint based on changes of an amplitude of the communication signal through the power-on sequence.

Example 4 includes the subject matter of any of Examples 1-3, and wherein to generate the communication fingerprint based on the communication signal comprises to generate the communication fingerprint based on changes of a frequency and an amplitude of the communication signal through the power-on sequence.

Example 5 includes the subject matter of any of Examples 1-4, and wherein the characteristics of the communication signal include a frequency of the communication signal.

Example 6 includes the subject matter of any of Examples 1-5, and wherein the characteristics of the communication signal include a signal strength of the communication signal.

Example 7 includes the subject matter of any of Examples 1-6, and wherein the power-on sequence corresponds to a duration of time required by the communication circuit of the mobile computing device to reach full power from an initial power-on state.

Example 8 includes the subject matter of any of Examples 1-7, and wherein to compare the communication fingerprint to one or more authorized communication fingerprints that corresponds to one or more mobile computing devices comprises to compare changes of a frequency of the communication signal over a period of time.

Example 9 includes the subject matter of any of Examples 1-8, and wherein to compare the communication fingerprint to one or more authorized communication fingerprints that corresponds to one or more mobile computing devices comprises to compare changes of an amplitude of the communication signal over a period of time.

Example 10 includes the subject matter of any of Examples 1-9, and wherein to compare the communication fingerprint to one or more authorized communication fingerprints that corresponds to one or more mobile computing devices comprises to compare changes of a frequency of the communication signal over a period of time and an amplitude of the communication signal over a period of time.

Example 11 includes the subject matter of any of Examples 1-10, and wherein to restrict the mobile computing device access to the network comprises to restrict the access of the mobile computing device access to at least a portion of the network.

Example 12 includes the subject matter of any of Examples 1-11, and wherein to restrict the mobile computing device access to the network comprises to restrict the access of the mobile computing device to files stored on a remote computing device.

Example 13 includes the subject matter of any of Examples 1-12, and further including an unauthorized access alert notification module to generate an alert in response to a determination that the mobile computing device is not authorized.

Example 14 includes the subject matter of any of Examples 1-13, and wherein to generate the alert comprises to generate an email to an administrator of the computing device.

Example 15 includes the subject matter of any of Examples 1-14, and wherein to generate the alert comprises to generate an event to an access control system in communication with the computing device.

Example 16 includes the subject matter of any of Examples 1-15, and further including a computing device location determination module to determine a location of the mobile computing device and log the location of the mobile computing device.

Example 17 includes the subject matter of any of Examples 1-16, and wherein the computing device location determination module is further determine whether the location of the mobile computing device corresponds to an authorized location.

Example 18 includes the subject matter of any of Examples 1-17, and further including an unauthorized access alert notification module to generate an alert in response to a determination that the location of the mobile computing device does not correspond to the authorized location.

Example 19 includes the subject matter of any of Examples 1-18, and wherein the network access control module is further to allow the mobile computing device to access the network in response to a determination that the mobile computing is authorized.

Example 20 includes the subject matter of any of Examples 1-19, and further including a network access usage monitoring module to monitor a usage of the accessed network by the mobile computing device.

Example 21 includes the subject matter of any of Examples 1-20, and wherein the network access usage monitoring module is further to determine whether the usage of the accessed network by the mobile computing device comprises an unapproved usage, and wherein the network access control module is further to restrict access to a network by the mobile computing device in response to a determination that the usage of the network by the mobile computing device comprises an unapproved usage.

Example 22 includes the subject matter of any of Examples 1-21, and further including an unauthorized access alert notification module to generate an alert subsequent to the determination that the usage of the network by the mobile computing device comprises an unapproved usage.

Example 23 includes the subject matter of any of Examples 1-22, and further including a user login authentication module to receive login credentials from the mobile computing device and restrict the mobile computing device access to the network in response to a determination that the received login credentials do not match an authorized login credential that corresponds to the mobile computing device.

Example 24 includes the subject matter of any of Examples 1-23, and further including an unauthorized access alert notification module to generate an alert in response to the determination that the received login credentials do not match an authorized login credential corresponding to the mobile computing device.

Example 25 includes the subject matter of any of Examples 1-24, and wherein the computing device comprises a network device.

Example 26 includes a method for monitoring a communication signal received at a computing device from a mobile computing device attempting to access a network, the method comprising generating, by the computing device, a communication fingerprint based on the communication signal received from the mobile computing device, wherein the communication fingerprint corresponds to characteristics of the communication signal during a power-on sequence of a transmission circuit of the mobile computing device; comparing, by the computing device, the communication fingerprint to one or more authorized communication fingerprints corresponding to one or more mobile computing devices to determine whether the mobile computing device is authorized; and restricting, by the computing device, access to the network by the mobile computing device in response to a determination that the mobile computing device is not authorized.

Example 27 includes the subject matter of Example 26, and wherein generating the communication fingerprint based on the communication signal comprises generating the communication fingerprint based on changes of a frequency of the communication signal during the power-on sequence.

Example 28 includes the subject matter of any of Examples 26 and 27, and wherein generating the communication fingerprint based on the communication signal comprises generating the communication fingerprint based on changes of an amplitude of the communication signal during the power-on sequence.

Example 29 includes the subject matter of any of Examples 26-28, and wherein generating the communication fingerprint based on the communication signal comprises generating the communication fingerprint based on changes of a frequency and an amplitude of the communication signal during the power-on sequence.

Example 30 includes the subject matter of any of Examples 26-29, and wherein the characteristics of the communication signal include a frequency of the communication signal.

Example 31 includes the subject matter of any of Examples 26-30, and wherein the characteristics of the communication signal include a signal strength of the communication signal.

Example 32 includes the subject matter of any of Examples 26-31, and wherein the power-on sequence corresponds to a duration of time required by the communication circuit of the mobile computing device to reach full power from an initial power-on state.

Example 33 includes the subject matter of any of Examples 26-32, and wherein comparing the communication fingerprint to one or more authorized communication fingerprints corresponding to one or more mobile computing devices comprises comparing changes of a frequency of the communication signal over a period of time.

Example 34 includes the subject matter of any of Examples 26-33, and wherein comparing the communication fingerprint to one or more authorized communication fingerprints corresponding to one or more mobile computing devices comprises comparing changes of an amplitude of the communication signal over a period of time.

Example 35 includes the subject matter of any of Examples 26-34, and wherein comparing the communication fingerprint to one or more authorized communication fingerprints corresponding to one or more mobile computing devices comprises comparing changes of a frequency of the communication signal over a period of time and an amplitude of the communication signal over a period of time.

Example 36 includes the subject matter of any of Examples 26-35, and wherein restricting the mobile computing device access to the network comprises restricting the access of the mobile computing device access to at least a portion of the network.

Example 37 includes the subject matter of any of Examples 26-36, and wherein restricting the mobile computing device access to the network comprises restricting the access of the mobile computing device to files stored on a remote computing device.

Example 38 includes the subject matter of any of Examples 26-37, and further including generating, by the computing device, an alert in response to a determination that the mobile computing device is not authorized.

Example 39 includes the subject matter of any of Examples 26-38, and wherein generating the alert comprises generating an email to an administrator of the computing device.

Example 40 includes the subject matter of any of Examples 26-39, and wherein generating the alert comprises generating an event to an access control system in communication with the computing device.

Example 41 includes the subject matter of any of Examples 26-40, and further including determining, by the computing device, a location of the mobile computing device; and logging, by the computing device, the location of the mobile computing device.

Example 42 includes the subject matter of any of Examples 26-41, and further including determining whether the location of the mobile computing device corresponds to an authorized location.

Example 43 includes the subject matter of any of Examples 26-42, and further including generating an alert in response to a determination that the location of the mobile computing device does not correspond to the authorized location.

Example 44 includes the subject matter of any of Examples 26-43, and further including allowing, by the computing device, the mobile computing device to access the network in response to a determination that the mobile computing is authorized.

Example 45 includes the subject matter of any of Examples 26-44, and further including monitoring, by the computing device, a usage of the accessed network by the mobile computing device.

Example 46 includes the subject matter of any of Examples 26-45, and further determining, by the computing device, whether the usage of the network by the mobile computing device comprises an unapproved usage; and restricting, by the computing device, access to the network of the mobile computing device, subsequent to determining the usage of the network by the mobile computing device comprises an unapproved usage.

Example 47 includes the subject matter of any of Examples 26-46, and further including generating, by the computing device, an alert subsequent to the determining the usage of the network by the mobile computing device comprises an unapproved usage.

Example 48 includes the subject matter of any of Examples 26-47, and further including receiving, by the computing device, login credentials from the mobile computing device; and restricting, by the computing device, the mobile computing device access to the network in response to a determination that the received login credentials do not match an authorized login credential corresponding to the mobile computing device.

Example 49 includes the subject matter of any of Examples 26-48, and further including generating, by the computing device, an alert in response to the determination that the received login credentials do not match an authorized login credential corresponding to the mobile computing device.

Example 50 includes a computing device comprising a processor; and a memory having stored therein a plurality of instructions that when executed by the processor cause the computing device to perform the method of any of Examples 26-49.

Example 51 includes one or more machine readable storage media comprising a plurality of instructions stored thereon that in response to being executed result in a computing device performing the method of any of Examples 26-49.

Example 52 includes a computing device to monitor a communication signal received from a mobile computing device, the computing device comprising means for generating, by the computing device, a communication fingerprint based on the communication signal received from the mobile computing device, wherein the communication fingerprint corresponds to characteristics of the communication signal during a power-on sequence of a transmission circuit of the mobile computing device; means for comparing, by the computing device, the communication fingerprint to one or more authorized communication fingerprints corresponding to one or more mobile computing devices to determine whether the mobile computing device is authorized; and means for restricting, by the computing device, access to the network by the mobile computing device in response to a determination that the mobile computing device is not authorized.

Example 53 includes the subject matter of Example 52, and wherein the means for generating the communication fingerprint based on the communication signal comprises means for generating the communication fingerprint based on changes of a frequency of the communication signal during the power-on sequence.

Example 54 includes the subject matter of any of Examples 52 and 53, and wherein the means for generating the communication fingerprint based on the communication signal comprises means for generating the communication fingerprint based on changes of an amplitude of the communication signal during the power-on sequence.

Example 55 includes the subject matter of any of Examples 52-54, and wherein the means for generating the communication fingerprint based on the communication signal comprises means for generating the communication fingerprint based on changes of a frequency and an amplitude of the communication signal during the power-on sequence.

Example 56 includes the subject matter of any of Examples 52-55, and wherein the characteristics of the communication signal include a frequency of the communication signal.

Example 57 includes the subject matter of any of Examples 52-56, and wherein the characteristics of the communication signal include a signal strength of the communication signal.

Example 58 includes the subject matter of any of Examples 52-57, and wherein the power-on sequence corresponds to a duration of time required by the communication circuit of the mobile computing device to reach full power from an initial power-on state.

Example 59 includes the subject matter of any of Examples 52-58, and wherein the means for comparing the communication fingerprint to one or more authorized communication fingerprints corresponding to one or more mobile computing devices comprises means for comparing changes of a frequency of the communication signal over a period of time.

Example 60 includes the subject matter of any of Examples 52-59, and wherein the means for comparing the communication fingerprint to one or more authorized communication fingerprints corresponding to one or more mobile computing devices comprises means for comparing changes of an amplitude of the communication signal over a period of time.

Example 61 includes the subject matter of any of Examples 52-60, and wherein the means for comparing the communication fingerprint to one or more authorized communication fingerprints corresponding to one or more mobile computing devices comprises means for comparing changes of a frequency of the communication signal over a period of time and an amplitude of the communication signal over a period of time.

Example 62 includes the subject matter of any of Examples 52-61, and wherein the means for restricting the mobile computing device access to the network comprises means for restricting the access of the mobile computing device access to at least a portion of the network.

Example 63 includes the subject matter of any of Examples 52-62, and wherein the means for restricting the mobile computing device access to the network comprises means for restricting the access of the mobile computing device to files stored on a remote computing device.

Example 64 includes the subject matter of any of Examples 52-63, and further including means for generating, by the computing device, an alert in response to a determination that the mobile computing device is not authorized.

Example 65 includes the subject matter of any of Examples 52-64, and wherein the means for generating the alert comprises means for generating an email to an administrator of the computing device.

Example 66 includes the subject matter of any of Examples 52-65, and wherein the means for generating the alert comprises means for generating an event to an access control system in communication with the computing device.

Example 67 includes the subject matter of any of Examples 52-66, and further including means for determining, by the computing device, a location of the mobile computing device; and means for logging, by the computing device, the location of the mobile computing device.

Example 68 includes the subject matter of any of Examples 52-67, and further including means for determining whether the location of the mobile computing device corresponds to an authorized location.

Example 69 includes the subject matter of any of Examples 52-68, and further including means for generating an alert in response to a determination that the location of the mobile computing device does not correspond to the authorized location.

Example 70 includes the subject matter of any of Examples 52-69, and further including means for allowing, by the computing device, the mobile computing device to access the network in response to a determination that the mobile computing is authorized Example 71 includes the subject matter of any of Examples 52-70, and further including means for monitoring, by the computing device, a usage of the accessed network by the mobile computing device.

Example 72 includes the subject matter of any of Examples 52-71, and further including means for determining, by the computing device, whether the usage of the network by the mobile computing device comprises an unapproved usage; and means for restricting, by the computing device, access to the network of the mobile computing device, subsequent to determining the usage of the network by the mobile computing device comprises an unapproved usage.

Example 73 includes the subject matter of any of Examples 52-72, and further including means for generating, by the computing device, an alert subsequent to the determining the usage of the network by the mobile computing device comprises an unapproved usage.

Example 74 includes the subject matter of any of Examples 52-73, and further including means for receiving, by the computing device, login credentials from the mobile computing device; and means for restricting, by the computing device, the mobile computing device access to the network in response to a determination that the received login credentials do not match an authorized login credential corresponding to the mobile computing device.

Example 75 includes the subject matter of any of Examples 52-74, and further including means for generating, by the computing device, an alert in response to the determination that the received login credentials do not match an authorized login credential corresponding to the mobile computing device.

The invention claimed is:

1. A computing device to monitor a communication signal received from a mobile computing device, the computing device comprising:
   a processor to establish:
      a communication fingerprint analysis module to analyze the communication signal and generate a communication fingerprint based on the communication signal, wherein the communication fingerprint corresponds to characteristics of the communication signal through a power-on sequence of a transmission circuit of the mobile computing device;
      a computing device authorization determination module to (i) compare the communication fingerprint to one or more authorized communication fingerprints that correspond to one or more mobile computing devices and (ii) determine whether the mobile computing device is authorized based on the comparison of the communication fingerprint and the one or more authorized communication fingerprints; and
      a network access control module to restrict access to a network by the mobile computing device in response to a determination that the mobile computing device is not authorized.

2. The computing device of claim 1, wherein to generate the communication fingerprint based on the communication signal comprises to generate the communication fingerprint based on changes of at least one of a frequency and an amplitude of the communication signal through the power-on sequence.

3. The computing device of claim 1, wherein the characteristics of the communication signal include a frequency and a signal strength of the communication signal.

4. The computing device of claim 1, wherein the power-on sequence corresponds to a duration of time required by the communication circuit of the mobile computing device to reach full power from an initial power-on state.

5. The computing device of claim 1, wherein to compare the communication fingerprint to the one or more authorized communication fingerprints that corresponds to one or more mobile computing devices comprises to compare changes of at least one of a frequency and an amplitude of the communication signal over a period of time.

6. The computing device of claim 1, further comprising:
   an unauthorized access alert notification module to generate an alert in response to a determination that the mobile computing device is not authorized, wherein to generate the alert comprises to generate at least one of an email to an administrator of the computing device and an event to an access control system in communication with the computing device.

7. The computing device of claim 1, wherein the network access control module is further to allow the mobile computing device to access the network in response to a determination that the mobile computing is authorized.

8. The computing device of claim 7, further comprising:
   a network access usage monitoring module to monitor a usage of the accessed network by the mobile computing device and determine whether the usage comprises an unapproved usage, wherein the network access control module is further to restrict access to a network by the mobile computing device in response to a determination that the usage of the network by the mobile computing device comprises an unapproved usage.

9. The computing device of claim 7, further comprising:
   a computing device location determination module to determine a location of the mobile computing device, log the location of the mobile computing device, and determine whether the location of the mobile computing device corresponds to an authorized location; and
   an unauthorized access alert notification module to generate an alert in response to a determination that the location of the mobile computing device does not correspond to the authorized location.

10. A method for monitoring a communication signal received at a computing device from a mobile computing device attempting to access a network, the method comprising:
   generating, by the computing device, a communication fingerprint based on the communication signal received from the mobile computing device, wherein the communication fingerprint corresponds to characteristics of the communication signal during a power-on sequence of a transmission circuit of the mobile computing device;
   comparing, by the computing device, the communication fingerprint to one or more authorized communication fingerprints corresponding to one or more mobile computing devices to determine whether the mobile computing device is authorized; and
   restricting, by the computing device, access to the network by the mobile computing device in response to a determination that the mobile computing device is not authorized.

11. The method of claim 10, wherein generating the communication fingerprint based on the communication signal comprises generating the communication fingerprint based on changes of at least one of a frequency and an amplitude of the communication signal during the power-on sequence.

12. The method of claim 10, wherein the characteristics of the communication signal include at least one of a frequency and a signal strength of the communication signal.

13. The method of claim 10, wherein the power-on sequence corresponds to a duration of time required by the communication circuit of the mobile computing device to reach full power from an initial power-on state.

14. The method of claim 10, wherein comparing the communication fingerprint to the one or more authorized communication fingerprints corresponding to one or more mobile computing devices comprises comparing changes of at least one of a frequency of the communication signal over a period of time and an amplitude of the communication signal over a period of time.

15. The method of claim 10, further comprising:
generating, by the computing device, an alert in response to a determination that the mobile computing device is not authorized, wherein generating the alert comprises generating at least one of an email to an administrator of the computing device and an event to an access control system in communication with the computing device.

16. The method of claim 10, further comprising:
allowing, by the computing device, the mobile computing device to access the network in response to a determination that the mobile computing is authorized; and
monitoring, by the computing device, a usage of the accessed network by the mobile computing device;
determining, by the computing device, whether the usage of the network by the mobile computing device comprises an unapproved usage; and
restricting, by the computing device, access to the network of the mobile computing device, subsequent to determining the usage of the network by the mobile computing device comprises an unapproved usage.

17. One or more non-transitory computer-readable storage media comprising a plurality of instructions stored thereon that in response to being executed cause a computing device to:
generate, by the computing device, a communication fingerprint based on the communication signal received from the mobile computing device, wherein the communication fingerprint corresponds to characteristics of the communication signal during a power-on sequence of a transmission circuit of the mobile computing device;
compare, by the computing device, the communication fingerprint to one or more authorized communication fingerprints corresponding to one or more mobile computing devices to determine whether the mobile computing device is authorized; and
restrict, by the computing device, access to the network by the mobile computing device in response to a determination that the mobile computing device is not authorized.

18. The one or more non-transitory computer-readable storage media of claim 17, wherein to generate the communication fingerprint based on the communication signal comprises to generate the communication fingerprint based on changes of at least one of a frequency and an amplitude of the communication signal through the power-on sequence.

19. The one or more non-transitory computer-readable storage media of claim 17, wherein the characteristics of the communication signal include a frequency and a signal strength of the communication signal.

20. The one or more non-transitory computer-readable storage media of claim 17, wherein the power-on sequence corresponds to a duration of time required by the communication circuit of the mobile computing device to reach full power from an initial power-on state.

21. The one or more non-transitory computer-readable storage media of claim 17, wherein to compare the communication fingerprint to the one or more authorized communication fingerprints that corresponds to one or more mobile computing devices comprises to compare changes of at least one of a frequency and an amplitude of the communication signal over a period of time.

22. The one or more non-transitory computer-readable storage media of claim 17, further comprising a plurality of instructions that in response to being executed cause the computing device to:
generate an alert in response to a determination that the mobile computing device is not authorized,
wherein to generate the alert comprises to generate at least one of an email to an administrator of the computing device and an event to an access control system in communication with the computing device.

23. The one or more non-transitory computer-readable storage media of claim 17, further comprising a plurality of instructions that in response to being executed cause the computing device to:
allow the mobile computing device to access the network in response to a determination that the mobile computing is authorized.

24. The one or more non-transitory computer-readable storage media of claim 23, further comprising a plurality of instructions that in response to being executed cause the computing device to:
monitor a usage of the accessed network by the mobile computing device; determine whether the usage comprises an unapproved usage; and
restrict access to a network by the mobile computing device in response to a determination that the usage of the network by the mobile computing device comprises an unapproved usage.

25. The one or more non-transitory computer-readable storage media of claim 23, further comprising a plurality of instructions that in response to being executed cause the computing device to:
determine a location of the mobile computing device;
log the location of the mobile computing device;
determine whether the location of the mobile computing device corresponds to an authorized location; and
generate an alert in response to a determination that the location of the mobile computing device does not correspond to the authorized location.

* * * * *